United States Patent
Cooper et al.

(10) Patent No.: US 10,479,717 B1
(45) Date of Patent: Nov. 19, 2019

(54) GLASS FOAM

(71) Applicant: Owens-Brockway Glass Container Inc., Perrysburg, OH (US)

(72) Inventors: Scott Cooper, Maumee, OH (US); Varun Mukheja, Toledo, OH (US); Tilak Gullinkala, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 658 days.

(21) Appl. No.: 15/284,278

(22) Filed: Oct. 3, 2016

(51) Int. Cl.
  *C03B 19/08* (2006.01)
  *C09K 21/02* (2006.01)

(52) U.S. Cl.
  CPC ............ *C03B 19/08* (2013.01); *C09K 21/02* (2013.01)

(58) Field of Classification Search
  CPC .................................. C03B 19/00; C03B 19/08
  See application file for complete search history.

(56) References Cited

U.S. PATENT DOCUMENTS

| | | | |
|---|---|---|---|
| 500,933 A | 7/1893 | McLaughlin | |
| 2,204,113 A | 6/1940 | Allen | |
| 2,976,161 A | 3/1961 | Smith | |
| 3,081,180 A | 3/1963 | Krinov | |
| 3,268,350 A | 8/1966 | Grebe et al. | |
| 3,542,534 A | 11/1970 | Yamamoto | |
| 3,717,486 A * | 2/1973 | Fukumoto | C03B 19/08 501/80 |
| 3,753,743 A | 8/1973 | Kakuda et al. | |
| 3,793,039 A | 2/1974 | Rostoker | |
| 3,799,754 A | 3/1974 | Thomas | |
| 3,933,514 A | 1/1976 | Banks et al. | |
| 3,967,943 A | 7/1976 | Seeley | |
| 3,969,100 A | 7/1976 | Kuna et al. | |
| 4,023,976 A | 5/1977 | Bauer et al. | |
| 4,031,175 A | 6/1977 | Cooper et al. | |
| 4,172,161 A | 10/1979 | Feldmann et al. | |
| 4,178,163 A * | 12/1979 | Wustefeld | C03C 11/00 65/22 |

(Continued)

FOREIGN PATENT DOCUMENTS

| CN | 1566001 A | 1/2005 |
|---|---|---|
| CN | 201856031 U | 6/2011 |

(Continued)

OTHER PUBLICATIONS

International Search Report and Written Opinion, Int. Application No. PCT/US2016/024001, Int. Filing Date: Mar. 24, 2016, Applicant: Owens-Brockway Glass Container Inc., dated Jun. 23, 2016.

(Continued)

*Primary Examiner* — Matthew E. Hoban

(57) ABSTRACT

A glass foam and methods of producing the same are disclosed. The glass foam is produced from a dried glass precursor gel having nanometer-sized pores and a bulk amorphous oxide-based matrix with an inorganic network of primary constituent oxides. One method includes obtaining the dried glass precursor gel, heating the dried glass precursor gel to a temperature below the melting point of the gel, maintaining the temperature for a time sufficient to expand the dried glass precursor gel, and expanding the dried glass precursor gel to form the glass foam.

23 Claims, 3 Drawing Sheets

(56) References Cited

U.S. PATENT DOCUMENTS

| | | | |
|---|---|---|---|
| 4,192,664 A * | 3/1980 | Joshi | C03B 19/08 |
| | | | 106/1.05 |
| 4,211,568 A | 7/1980 | Davis | |
| 4,219,361 A | 8/1980 | Sutton et al. | |
| 4,273,568 A | 6/1981 | Scholl et al. | |
| 4,283,427 A | 8/1981 | Winters | |
| 4,430,107 A | 2/1984 | Dennert et al. | |
| 4,514,329 A | 4/1985 | Wakabayashi et al. | |
| 4,607,015 A | 8/1986 | Clough et al. | |
| 4,661,299 A | 4/1987 | Thorsrud | |
| 4,806,718 A | 2/1989 | Seaborne | |
| 4,808,780 A | 2/1989 | Seaborne | |
| 4,810,845 A | 3/1989 | Seaborne | |
| 4,842,630 A | 6/1989 | Braithwaite et al. | |
| 4,851,150 A | 7/1989 | Hench et al. | |
| 4,857,289 A | 8/1989 | Nauroth et al. | |
| 5,000,933 A | 3/1991 | Novotny et al. | |
| 5,084,262 A | 1/1992 | Novotny et al. | |
| 5,196,382 A | 3/1993 | Hench et al. | |
| 5,310,594 A | 5/1994 | Holland et al. | |
| 5,686,031 A | 11/1997 | Coronado et al. | |
| 6,408,649 B1 | 6/2002 | Sklyarevich et al. | |
| 6,497,945 B1 | 12/2002 | Niedner et al. | |
| 6,568,215 B2 | 5/2003 | Schofield et al. | |
| 6,797,658 B2 | 9/2004 | Pecoraro et al. | |
| 6,878,652 B2 | 4/2005 | Pecoraro et al. | |
| 6,902,814 B2 | 6/2005 | Takahashi et al. | |
| 6,909,075 B2 | 6/2005 | Jakeset et al. | |
| 6,938,441 B1 | 9/2005 | Hajek | |
| 7,260,960 B2 | 8/2007 | Carty | |
| 7,297,909 B2 | 11/2007 | Smrcek et al. | |
| 8,361,621 B2 | 1/2013 | Cook | |
| 8,919,151 B2 | 12/2014 | Shinohara | |
| 8,936,850 B2 | 1/2015 | Wang | |
| 9,067,348 B2 | 6/2015 | Albrecht | |
| 9,272,946 B2 | 3/2016 | Chang et al. | |
| 9,321,675 B2 | 4/2016 | Jain | |
| 2003/0122274 A1* | 7/2003 | Lee | C03B 19/08 |
| | | | 264/109 |
| 2004/0099010 A1 | 5/2004 | Johansson | |
| 2004/0241238 A1* | 12/2004 | Sepulveda | A61L 27/10 |
| | | | 424/486 |
| 2006/0081004 A1 | 4/2006 | Ishikawa et al. | |
| 2008/0286555 A1* | 11/2008 | Huston | C01B 33/124 |
| | | | 428/314.8 |
| 2009/0293544 A1 | 12/2009 | Fregonese et al. | |
| 2011/0192321 A1 | 8/2011 | Bohlander et al. | |
| 2012/0074150 A1 | 3/2012 | Wortmann et al. | |
| 2012/0125052 A1 | 5/2012 | Dong | |
| 2012/0159994 A1 | 6/2012 | Sakamoto et al. | |
| 2013/0239618 A1 | 9/2013 | Ishikawa et al. | |
| 2014/0345328 A1 | 11/2014 | Folgar | |
| 2015/0329286 A1 | 11/2015 | Geib | |
| 2015/0360961 A1 | 12/2015 | Dikawa et al. | |
| 2016/0289114 A1 | 10/2016 | Cooper et al. | |

FOREIGN PATENT DOCUMENTS

| | | |
|---|---|---|
| CN | 102584018 A | 7/2012 |
| CN | 203128388 U | 8/2013 |
| CN | 103880268 A | 6/2014 |
| CZ | 291652 B | 4/2003 |
| CZ | 298244 B | 8/2007 |
| DE | 4013343 A1 | 5/1991 |
| DE | 102009053785 A1 | 5/2011 |
| EP | 0892586 A2 | 1/1999 |
| EP | 0826630 B1 | 5/2001 |
| EP | 1411032 A1 | 4/2004 |
| EP | 2647605 A1 | 9/2013 |
| GB | 2047678 A | 12/1980 |
| GB | 2181727 A | 4/1987 |
| IN | 00243KO2010 A | 11/2012 |
| JP | S5751133 A | 3/1982 |
| JP | 57145036 A | 9/1982 |
| JP | S58156542 A | 9/1983 |
| JP | 2001106552 A | 4/2001 |
| JP | 2005255443 A | 9/2005 |
| JP | 2006273621 A | 10/2006 |
| JP | 2007045704 A | 2/2007 |
| RU | 2133715 C1 | 7/1999 |
| RU | 2134244 C1 | 8/1999 |
| RU | 2134245 C1 | 8/1999 |
| WO | 91/19673 A1 | 6/1991 |
| WO | 2006043909 A1 | 4/2006 |
| WO | 2006059576 A1 | 6/2006 |
| WO | 2012012259 A1 | 1/2012 |
| WO | 2013154499 A1 | 10/2013 |

OTHER PUBLICATIONS

Kasgoz, Ahmet et al., "Sol-gel Preparation of Borosilicates," Journal of Non-Crystalline Solids, North-Holland Physics Publishing, Amsterdam, NL, vol. 243, No. 2-3, Feb. 1, 1999, pp. 168-174.

Saxena, V.K. et al., "Microwave Synthesis: A Physical Concept," Intech, 2011, pp. 3-22.

Kato, Yoshiyuki et al, "Dielectric Properties of Uranium and Plutonium Nitrate solution and the Oxide Compounds formed in the De-nitration process by the Microwave Heating Method," Journal of Nuclear Science and Technology, 2004, pp. 857-862.

Newnham et al., "Fundamental interaction mechanisms between microwaves and matter," Materials Research Laboratory, Pennsylvania State University, 1991, pp. 51-67.

Mandal, Ashis Kumar et al., "Microwave Preparation of $SiO_2$—$B_2O_3$—$Na_2O$—$K_2O$—$CaO$—$Fe_2O_3$—$TiO_2$ Glass System," J. Chem. Eng., 2014, pp. 349-357.

Mandal, Ashis Kumar et al., "Higher $Fe^{2+}$/total Fe ratio in iron doped phosphate glass melted by microwave heating," Materials Research Bulletin, 2015, Abstract.

Mandal, Ashis Kumar et al., "Preparation of alumino-phosphate glass by microwave radiation," Journal of Materials Research, Jul. 2013, Abstract.

Mandal, Ashis Kumar et al., "Preparation of homogenous barium borosilicate glass using microwave energy," Journal of Non-Crystalline Solids, Jul. 2013, Abstract.

Sarkar et al., "Synthesis of Bioactive Glass by Microwave Energy Irradiation and Its In-Vitro Biocompatibility," Bioceramics Development and Applications, 2011, pp. 1-3.

Kharissova et al., "Review: The Use of Microwave Irradiation in the Processing of Glasses and Their Composites," Ind. Eng. Chem. Res., 2010, pp. 1457-1466.

Almeida et al., "Characterization of iron phosphate glasses prepared by microwave heating," Journal of Non-Crystalline Solids, 2007, Abstract.

Ghussn et al., "A novel method to produce niobium phosphate glasses by microwave heating," Energy and Nuclear Research Institute, 2004, Abstract.

Van Der Biest et al., "Microwave processing of sol-gel glasses and ceramics," Department of Metallurgy and Materials Engineering, Katholieke University Leuven, 1996, Abstract.

Knox, M. P. et al., "Use of microwave radiation for the processing of glass," Glass Technology, 1997, Abstract.

Potts et al., "Melting rate of soda-lime glasses as influenced by grain sizes of raw materials and additions of cullet," J. Am. Ceramc. Soc., 1944, 27 [8] pp. 225-231.

Tykachinsky et al., "Effect of find grinding of glass batch," Glass Ceram., 1956, pp. 7-16.

Boffe et al, "The influence of the size of raw materials on the rate of melting of glass," Glass Technol., 1962, 3 [4] pp. 117-123.

Suda et al., "Synthesis of MgO—$SiO_2$ and CaO—$SiO_2$ amorphous powder by sol-gel process and ion exchange," J Non-Cryst Solids, 1999, pp. 178-184.

Kalousek et al., "Studies of portions of the quaternary system soda-lime-silica-water at 25C," National Bureau of Standards Research Paper RP1590, 1944, pp. 285-302.

(56) References Cited

OTHER PUBLICATIONS

Way et al., "Study of Some Synthetically prepared hydrous alkali calcium silicates," Cement and Concrete Research, vol. 2, 1992, pp. 915-926.

* cited by examiner

GLASS FOAM

This patent application discloses a glass foam for use as insulating material and, more particularly, methods to form the glass foam from a glass precursor gel.

BACKGROUND

Glass foams can be made from pre-formulated feedstocks. For example, a typical glass feedstock contains sodium silicate. Aqueous sodium silicate is known to display intumescence and/or volume expansion upon heating. However, sodium silicate is generally water-soluble, and foam products resulting from sodium silicate often display poor chemical durability. It is possible to make a more chemically durable glass foam by using glass particles, such as recycled, ground glass known in the industry as "cullet," and adding additional materials, such as an external or additional blowing agent (e.gs., sodium carbonate, calcium carbonate, calcium sulfate, carbon, sugar, and the like) and a binder.

However, obtaining a glass feedstock typically involves a process that requires high temperatures for melting the raw materials and long residence times. For example, a typical glass feedstock includes a physical mixture of virgin raw materials and, optionally, cullet. The virgin raw materials contain quartz sand (crystalline $SiO_2$) and other ingredients, such as soda ash ($Na_2CO_3$) and limestone ($CaCO_3$) for soda-lime-silica glass, for example, and the cullet primarily contains shards of glass from previously-formed consumer or commercial glass products that are consistent with the desired characteristics of the final glass product.

The residence time and temperatures required to melt conventional glass feedstock in the glass furnace are relatively long and high, respectively. The melting of the glass feedstock can be made less taxing if some of the virgin raw materials are replaced with cullet in the feedstock. But cullet is not widely available as a commodity in some regions and, even if it is, bulk purchases of the recycled material are subject to great variations in color and other characteristics that may restrict glass manufacturing options.

BRIEF SUMMARY OF THE DISCLOSURE

The present disclosure embodies a number of aspects that can be implemented separately from or in combination with each other. One or more embodiments set forth in the present disclosure may achieve any of a variety of objectives including, for example, forming a glass foam having a high chemical durability, but without having to use pre-melted and/or recycled glass and without having to use feedstock materials that require long residence times or high temperatures in a glass furnace in order to achieve homogeneous and refined molten glass. The glass precursor gel used to produce the glass foam has nanometer-sized pores and can be expanded to a glass foam having a final volume being several times greater than the initial volume of the gel. The chemically homogenously mixed gel can be precipitated from sodium silicate and can be heated to a foamed state without undergoing a melting step (e.g., in a furnace). The glass foam produced can be used as an insulating material, having thermal and acoustic insulating properties.

In accordance with one aspect of the disclosure, there is provided a method of producing a glass foam by, first, obtaining a dried glass precursor gel comprising nanometer-sized pores and a bulk amorphous oxide-based matrix having an inorganic network of primary constituent oxides. The primary constituent oxides can include 30 mol % to 90 mol % silica ($SiO_2$) and one or more of the following: (A) 0.1 mol % to 25 mol % of one or more alkali oxides in sum total, (B) 0.1 mol % to 30 mol % of one or more alkaline earth oxides in sum total, (C) 1 mol % to 25 mol % boric oxide, (D) 5 mol % to 80 mol % lead oxide, or (E) 0.1 mol % to 15 mol % aluminum oxide. After obtaining the glass precursor gel, the method includes heating the dried glass precursor gel to a temperature below the melting point of the gel. After heating the dried glass precursor gel, the method includes maintaining the temperature for a time sufficient to expand the dried glass precursor gel. After maintaining the temperature, the method includes expanding the dried glass precursor gel to form a glass foam.

In accordance with another aspect of the disclosure, there is provided a method of producing an insulating material by the same steps as indicated in the first aspect above, with the additional step of incorporating the glass foam into the insulating material after the step of expanding the dried glass precursor gel to form a glass foam. In one example, the temperature is maintained between 650° C. to 850° C. for 30 minutes to expand the dried glass precursor gel to form the glass foam.

The temperature to expand the dried glass precursor gel is significantly lower than would be required to form a glass feedstock using conventional methods. As will be discussed in further detail below, conventional methods require temperatures of about 1400° C. to form a molten soda-lime-silica glass feedstock that can be foamed. With the methods discussed herein, the relatively lower temperature of 650° C. to 850° C. makes these method(s) more energy efficient and reduces the carbon footprint of a manufacturing plant implementing one or more of these methods.

In any of the methods described herein, the dried glass precursor gel can be formed by, first, obtaining a wet glass precursor gel having the bulk amorphous oxide-based matrix being homogeneously chemically mixed and having a gel density of less than 2.0 g/cm³. Second, the method includes drying the wet glass precursor gel to form the dried glass precursor gel before the step of obtaining a dried glass precursor gel. In one example, this drying step involves removing solvents in the wet glass precursor gel by drying the wet glass precursor gel or precipitate at a drying temperature of 120° C.

Additionally, forming the dried glass precursor gel will produce no carbon dioxide or substantially no carbon dioxide. This reduces the carbon emissions of those utilizing the dried glass precursor gel as compared to those utilizing conventional glass melting furnaces to obtain the glass feedstock to be foamed.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

Glass foams can be used as or incorporated into insulating material. Foam structures, such as glass foam, can trap air and other gases within their porous matrix. This trapped air and gas can provide an insulating effect against sound waves and/or heat flow. With respect to sound waves, foam structures can absorb the energy of sound waves within their porous matrix, reducing sound leakage to the surrounding environment. With respect to heat flow, foam structures can similarly absorb thermal energy, and reduce heat transfer to the surrounding environment.

A glass foam suitable for use as an insulating material can be produced by first obtaining or forming a dried glass precursor gel, or xerogel, that can be used as an alternative to traditional glass feedstock mixtures. The glass precursor gel comprises a bulk amorphous (i.e., non-crystalline) oxide-based matrix characterized by an inorganic network of at least the primary constituent oxides of the final glass composition. The primary constituent oxides are present in the amorphous oxide-based matrix at the desired proportions of the final glass composition. More specifically, the primary glass-forming constituent oxides included in the amorphous oxide-based matrix are 30 mol % to 90 mol % silica and one or more of the following: (A) 0.1 mol % to 25 mol % of one or more alkali oxides (mol % is the sum total); (B) 0.1 mol % to 30 mol % of one or more alkaline earth oxides (mol % is the sum total); (C) 1 mol % to 25 mol % boric oxide ($B_2O_3$); (D) 5 mol % to 80 mol % lead oxide (PbO), or (E) 0.1 mol % to 15 mol % aluminum oxide ($Al_2O_3$). The one or more alkali oxides may be selected from the group consisting of lithium oxide ($Li_2O$), sodium oxide ($Na_2O$), potassium oxide ($K_2O$), rubidium oxide ($Rb_2O$), cesium oxide ($Cs_2O$), and combinations thereof, and the one or more alkaline earth oxides may be selected from the group consisting of magnesium oxide (MgO), calcium oxide (CaO), strontium oxide (SrO), barium oxide (BaO), and combinations thereof. The glass precursor gel is similar to that disclosed in U.S. patent application Ser. No. 14/676,372, which is assigned to the assignee hereof and incorporated herein by reference in its entirety. Additionally, this application relates to U.S. patent application Ser. No. 15/284,263, entitled "Glass Precursor Gel and Methods to Treat with Microwave Energy," filed Oct. 3, 2016, (Attorney Docket 19359) and U.S. patent application Ser. No. 15/284,286, entitled "Glass Coatings and Methods to Deposit Same," filed Oct. 3, 2016, (Attorney Docket 19361) each of which are assigned to the assignee hereof and incorporated herein by reference in their entireties.

Figure 1:
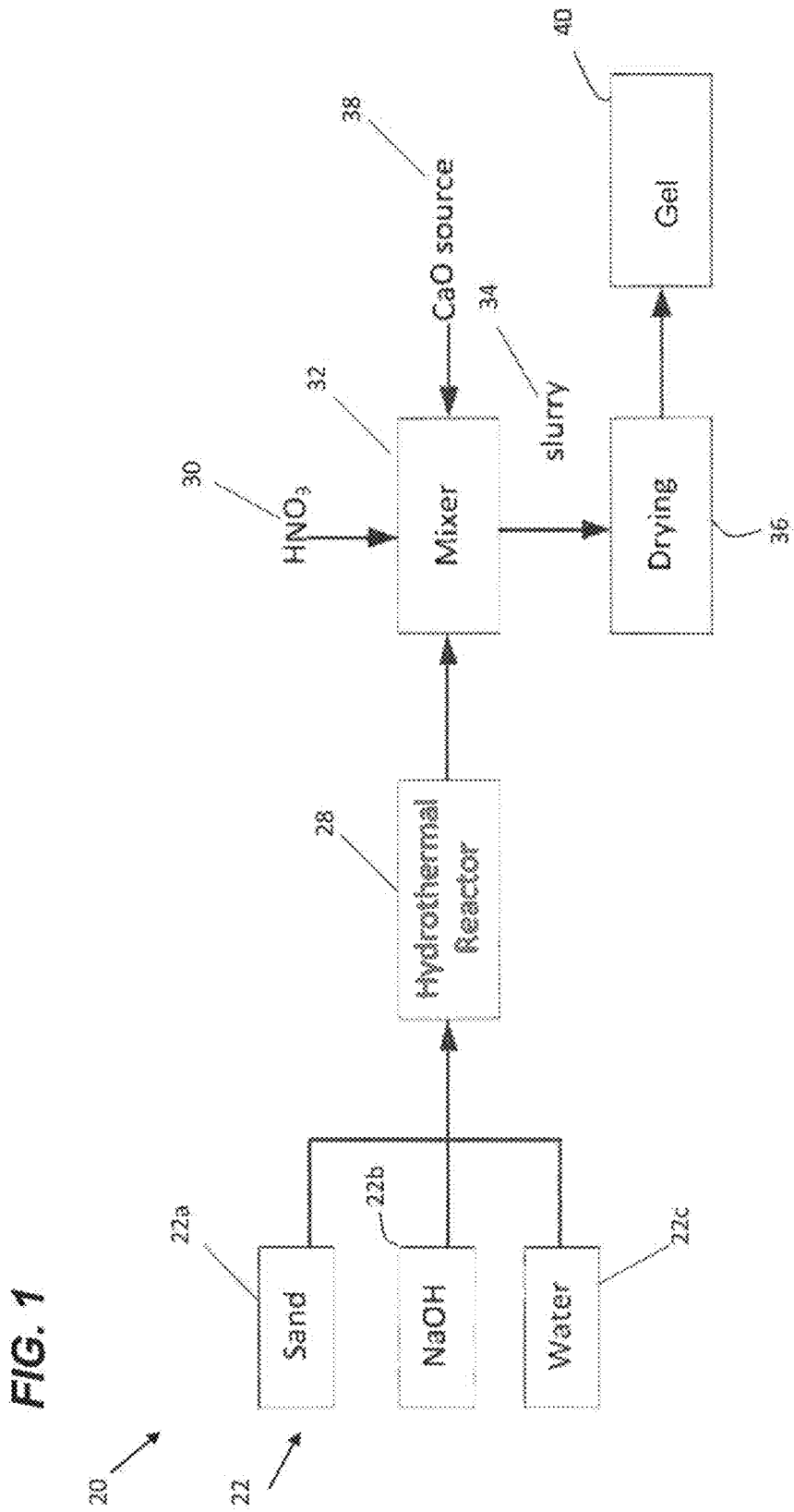
FIG. 1 is a flow diagram that depicts a first method of preparing and using a dried glass precursor gel.

One illustrative example of forming the glass precursor gel is depicted in FIG. 1. FIG. 1 is a flow diagram 20 that depicts a first method of preparing the gel. In step 22, quartz sand having silica ($SiO_2$) 22a, NaOH 22b, and water 22c are mixed together. In step 22, mixing the sand with caustic components (e.g., NaOH 22b) causes the sand to be dissolved hydrothermally at moderate temperatures, as will be discussed further below. This chemical dissolution contributes to the final gel having reduced melting time and/or not having to go through a melting step prior to forming a foam. For example, conventional glass feedstock materials (e.g., cullet) often requires melting at high temperatures, and even subsequent cooling, before the feedstock materials can be utilized in glass foams. Additionally, blowing agents or additives may be necessary to cause foaming, as will be described in further detail below. The glass precursor gel described herein does not require melting at high temperatures in order to create a gel that can be subsequently foamed. Additionally, the glass precursor gel does not require a blowing agent being added in order to cause foaming. In step 28, these three components are added to a hydrothermal reactor. In step 32, these components are moved to a mixer, in which nitric acid ($HNO_3$) 30 and a soluble source of CaO 38 are added to form the oxide-based matrix. As discussed herein, additional components could be added to the mixer in step 32.

In one embodiment, the amorphous oxide-based matrix may include at least 60 mol % to 85 mol % silica ($SiO_2$), 8 mol % to 18 mol % sodium oxide ($Na_2O$), and 5 mol % to 15 mol % calcium oxide (CaO) as the primary constituent oxides, in which case the gel is composed to produce soda-lime-silica glass foam. In other embodiments, the glass precursor gel may be composed to produce other types of glass foams including borosilicate glass and lead sealing glass. Regarding borosilicate glass foam, the amorphous oxide-based matrix may include at least 30 mol % to 85 mol % silica and 0 mol % to 20 mol % boric oxide, along with at least one of 0 mol % to 30 mol % calcium oxide or 0 mol % to 20 mol % sodium oxide, as the primary constituent oxides depending on the anticipated end-use. Regarding lead sealing glass foam, the amorphous oxide-based matrix may include at least 30 mol % to 70 mol % silica, 15 mol % to 80 mol % lead oxide, and at least one of 3 mol % to 15 mol % potassium oxide, 2 mol % to 10 mol % sodium oxide, or 4 mol % to 10 mol % barium oxide, as the primary constituent oxides.

In addition to the primary constituent oxides, the amorphous oxide-based matrix may optionally include a number of secondary materials that are commonly used in glass foams. Examples of such secondary materials are up to 25 mol % total of other glass network-formers, up to 2 mol % total of coloring and/or decoloring agents, and up to 20 mol % total of other materials that can affect the physical properties and/or the redox state of the final glass product composition. Specific other glass network-formers that may be added include one or more of phosphorus oxide ($P_2O_5$) and germanium oxide ($GeO_2$). Specific colorants and decolorants that may be added include the elemental forms or oxide compound forms of one or more of selenium, chromium, manganese, iron, cobalt, nickel, copper, niobium, molybdenum, silver, cadmium, indium, tin, gold, cerium, praseodymium, neodymium, europium, gadolinium, erbium, and uranium. And specific materials that can affect the physical properties and/or the redox state of the glass include one or more of carbon (0 mol % to 3 mol %), nitrates (0 mol % to 3 mol %), selenium (0 mol % to 1 mol %), titanium oxide ($TiO_2$) (0 mol % to 5 mol %), arsenic oxide ($As_2O_3$) (0 mol % to 2 mol %), vanadium oxide ($V_2O_5$) (0 mol % to 5 mol %), fluorines (0 mol % to 2 mol %), chlorines (0 mol % to 2 mol %), and sulfates (0 mol % to 2 mol %).

The exact composition of the amorphous oxide-based matrix including the proportions of its primary constituent oxides and optional secondary materials can be varied to achieve any of the large variety of glass chemistries that may be desired in the final foam product. Both the physical and chemical properties of the resultant glass foam derived from the glass precursor gel can be affected by variances in the relative proportions of the primary constituent oxides as well as the inclusion or exclusion of certain secondary materials in the amorphous oxide-based matrix. Accordingly, in order to derive these types of finished glass foams from the glass precursor gel, the amorphous oxide-based matrix can be prepared to have the same proportions of the primary constituent oxides and secondary materials so that, upon expansion, a glass foam is obtained that has desired characteristics.

Within the amorphous oxide-based matrix, the primary constituent oxides and any secondary materials, which may or may not be present, are homogeneously chemically mixed (e.g., FIG. 1, mixing step 32). The term "homogeneously chemically mixed" and its grammatical variations, as used herein, means that multiple different samples of the gel will have the same mole percentages of the three primary constituent oxides present in the greatest amounts in the amorphous oxide-based matrix. Different samples can be said to have the same mole percentages of the three primary constituent oxides when the mole percent of each primary constituent oxide in each sample lies within a range of ±3% of the arithmetic average [i.e., (0.97)*(average)<sample<(1.03)*(average)] of its respective oxide as determined from the various samples taken. For example, five random, different samples of a glass precursor gel have been found through x-ray fluorescence to have the following mole percentages of the three main primary constituent oxides (here, silica, sodium oxide, and calcium oxide):

TABLE 1

Compositions of Samples

| Sample # | Mole Percentage of: | | |
|---|---|---|---|
| | $SiO_2$ | $Na_2O$ | CaO |
| 1 | 72.3 | 14.2 | 12.1 |
| 2 | 72.2 | 14.1 | 12.2 |
| 3 | 71.8 | 14.2 | 12.5 |
| 4 | 72.1 | 14.1 | 12.4 |
| 5 | 72.5 | 13.9 | 12.3 |
| Avg | 72.2 | 14.1 | 12.3 |

As can be seen, in this group of samples, the arithmetic average of silica, sodium oxide, and calcium oxide as determined from the five samples is 72.2 mol %, 14.1 mol %, and 12.3 mol %, respectively. The range of ±3% of the arithmetic average for each of the primary constituent oxides can then be calculated as 70.03-74.34 mol % for silica, 13.68-14.52 mol % for sodium oxide, and 11.93-12.67 mol % for calcium oxide. The mole percentage of each primary constituent oxide in each sample clearly falls within those prescribed ranges, and thus confirms that the amorphous oxide-based matrix of the glass precursor gel is homogeneously chemically mixed.

The amorphous oxide-based matrix of the present disclosure is different than a glassy polymer network or glassy polymer. Polymers are large molecules, or macromolecules, formed of repeating monomer subunits. Polymers often contain continuously linked backbone chains, made up primarily of carbon atoms. A polymer microstructure is formed by the physical arrangement or geometry of the monomer residues along the backbone chain.

Polymers can have the ability or tendency to form a glass or semicrystalline structure, made of the repeating monomer subunits. Due to their ability to form non-crystalline or amorphous solid structures and exhibit a glass transition when heated, polymers can be generally categories as glass structures, but these glassy polymer structures are distinguishable from traditional or conventional glass (e.g., silica glass) because of their monomer, organic networks. In one aspect, the glass precursor gel of the present application is not a glassy polymer or glassy polymer network with repeating, organic monomers.

Returning to FIG. 1, whichever components are chosen to form the mixture, upon mixing, these components form a slurry 34 (e.g., SLS slurry). In step 36, the slurry 34 is dried. This forms the dried glass precursor gel in step 40.

The amorphous oxide-based matrix is light, porous, and hygroscopic, which allows for an extending swelling agent, such as water, to be entrapped within the inorganic network of oxides. Indeed, water is typically retained in the dried glass precursor gel at a relatively high amount as compared to cullet. In particular, cullet evolves water vapor up to about 125° C. when heated at a rate of 5° C. per minute starting from STP (1 atm pressure and 20° C.), and is thoroughly dried for the most part at 150° C., which is typical of physically entrained water. On the other hand, the dried glass precursor gel continues to evolve water vapor—an additional 1-10 wt. %—above 125° C. and up to 400° C. when subjected to the same incremental heating, and may even retain as much as 0.5 wt. % water at 400° C., which is indicative of water that is chemically bound to amorphous oxide-based matrix as a swelling agent. The presence of retained chemically-bound water within the amorphous oxide-based matrix may be advantageous in some instances since it acts as a flux that lowers the processing temperature of molten glass, particularly at low temperatures. And despite the fact that the glass precursor gel typically includes chemically-entrained water within its amorphous oxide-based matrix, the glass precursor gel has a density of less than 2.0 $g/cm^3$, preferably between 1.6 $g/cm^3$ and 1.85 $g/cm^3$, including all ranges, subranges, and values therebetween, and a surface area of at least 20 $m^2/g$, preferably about 25 $m^2/g$ to about 40 $m^2/g$, including all ranges, subranges, and values therebetween, as measured by nitrogen BET adsorption. The dried glass precursor gel is thus less dense and has a higher surface area than cullet. In some aspects, the density of the dried glass precursor gel is less than 600 $m^2/g$.

In addition to the water, the gel can have excess nitrate ions, $NO_3^-$. As shown in FIG. 1, step 30, nitric acid is added to the mixture, which reacts with the additional components to form nitrate ions. As will be discussed further below, nitric acid can neutralize some of the sodium silicate into silicic acid and sodium nitrate. Additionally, the dried glass precursor gel contains nanometer-sized pores within its bulk amorphous oxide-based matrix.

In some aspects, neither the dried glass precursor gel nor the resulting foam include large quantities of crystalline materials and, most notably, the amorphous oxide-based matrix does not contain any crystalline precursor materials of silica such as, for example, quartz sand, as will be discussed further below. The absence of quartz sand is noteworthy here. Unlike conventional glass feedstocks that contain a fair amount of quartz sand, which generally has a slow dissolution rate during melting, the glass precursor gel does not have to be maintained in a molten state at high temperatures for long durations in order to achieve satisfactory $SiO_2$ dissolution. Other crystalline materials that may be omitted during formation of the dried glass precursor gel are pre-melted glass, recycled glass, rock, clay, ore, and/or ash.

The amorphous oxide-based matrix also includes virtually no carbonate-containing materials and, as such, will produce no more than a negligible amount of $CO_2$ upon melting and hence substantially no bubbles within the molten glass, although there may be bubbles from trapped air pockets, nitrate decomposition, and water evolution. For purposes of this disclosure, "substantially" means that a given quantity is no more than 10%, preferably no more than 5%, more preferably no more than 1%, of a comparison value (e.g., volumetric value in a molten or solidified state). For example, "substantially no" carbon dioxide means to reduce the volume of any remaining carbon dioxide such that the volume of the total glass gel precursor with any remaining $CO_2$ is no more than 10%, preferably no more than 5%, more preferably no more than 1% greater than the volume of the glass gel precursor alone. This could be measured either in the dried or wet gelatinous state. The amount of any remaining $CO_2$ could also be compared to the volume of gas generated from melting raw materials from batch (sand, soda ash, limestone, and the like).

To be sure, as mentioned above, conventional soda-lime-silica glass feedstocks are typically melted in a furnace and maintained at 1400° C. or higher for at least about 24 hours in order to obtain a suitably refined and homogenized molten glass. In this disclosure, it is possible and desirable to avoid heating the dried glass precursor gel to such high temperatures. Such a high temperature is unnecessary to form the wet glass precursor gel. Additionally, upon foaming the dried glass precursor gel, it is desirable to heat the gel to below its melting point to avoid preventing or destroying foam formation. While the melting point may vary depending on the composition, the melting point may be greater than 850° C. In some cases, the temperature is at or above the gel's softening point.

By chemically synthesizing the glass precursor gel, the three rate-limiting steps of conventional glass making—dissolution of quartz sand, bubble removal, and homogenization/mixing of the primary constituent oxides—are accomplished at low temperatures by way of chemical reactions, not the standard procedure in which crystalline raw materials (and optionally some cullet) are physically mixed, melted, and maintained in a molten state to facilitate dissolution. Specifically, even if using a quartz sand, the glass precursor gel can be chemically synthesized at temperatures below 300° C., which is well below the melting point or softening point of quartz sand. And, once formed, the glass foam can be utilized in insulating material, such as thermal and acoustical insulation. Due to the high energy demands to create a molten glass intermediate using conventional methods, the dried glass precursor gel can produce a glass foam more efficiently than through a conventional molten glass. This low-temperature pre-melting chemical synthesis of the gel can ultimately lower the furnace energy consumption and reduce the infrastructure and furnace footprint attributed to each glass foam product produced.

The glass precursor gel can be chemically synthesized by precipitating the gel from a soluble alkali silicate. In general, a silicate solution containing the soluble alkali silicate is first prepared. One way to prepare the silicate solution, for example, is to hydrothermally dissolve quartz sand in a caustic aqueous alkali-based solvent. The ratio of $SiO_2$ to the alkali oxide in the alkali silicate can be adjusted in solution as needed. Next, the alkali silicate is precipitated out of solution with an alkaline earth salt to provide a wet precipitate that, by design, has the same proportions of the primary constituent oxides as the desired end-use glass composition. And finally, solvent may be removed from the wet precipitate to derive the glass precursor gel.

The dried glass precursor gel and the glass foam of the present disclosure do not require the use of a mold or similar vessel during formation. The dried glass precursor gel and/or the glass foam can be formed as discussed above, and this formation does not require that the raw materials and/or resulting foams are contained, gelled, dried, heated, expanded, confined, or otherwise placed within a mold or similar container during synthesis. While the glass foam may be further processed in a mold or similar vessel to form a desired shape, neither the dried gel nor foam formation require a mold in order to be formed.

Figure 2:
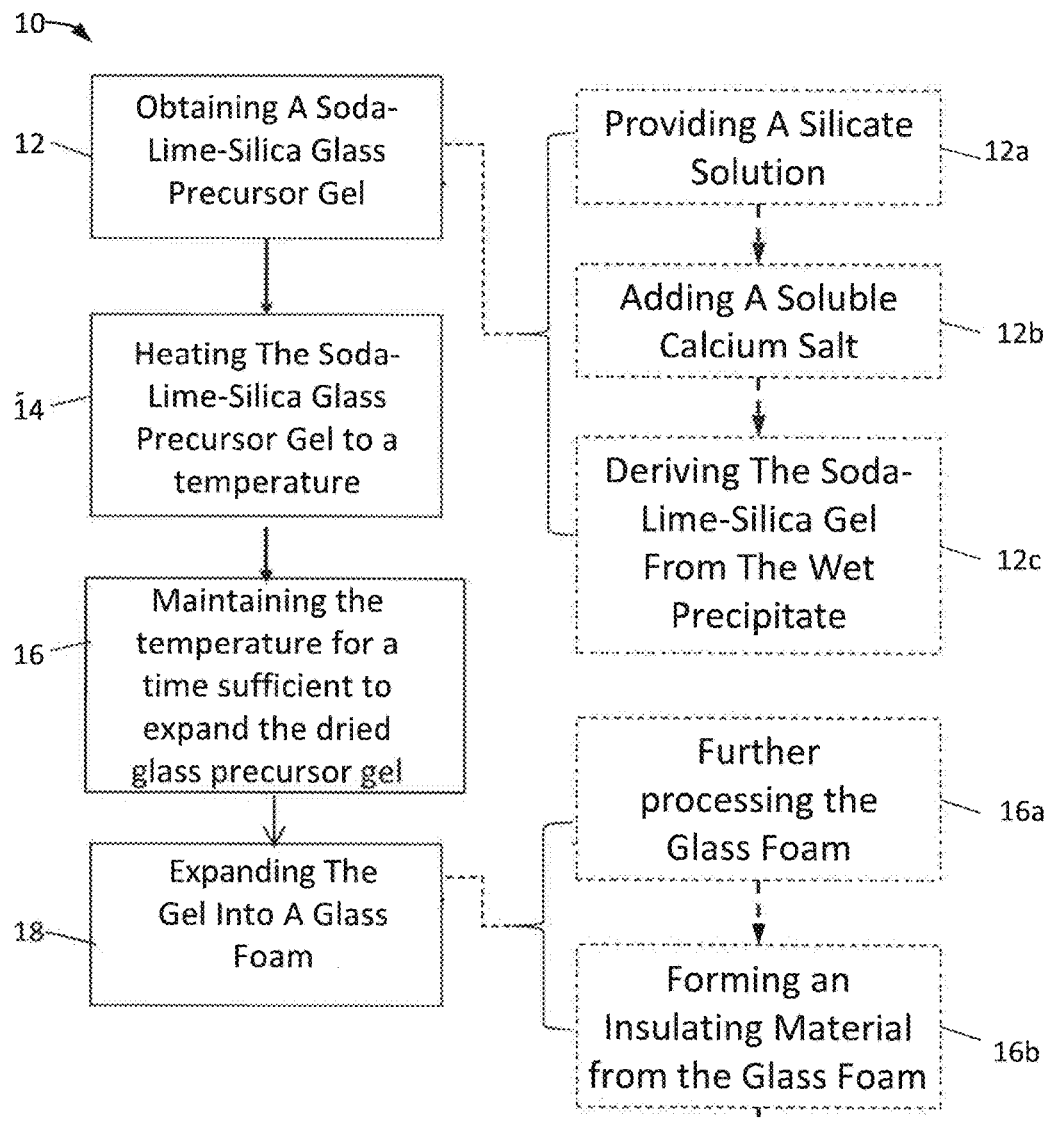
FIG. 2 is a flow diagram that depicts a second method of preparing and using the dried glass precursor gel, in particular a soda-lime-silica glass precursor gel.

The glass foam can be further processed downstream to form various insulating materials as shown diagrammatically in FIG. 2. There, the method of making an insulating material is illustrated, and described in the corresponding text, specifically in the context of using one type of the glass precursor gel-namely, a soda-lime-silica ("SLS") glass precursor gel. The method is identified by reference numeral 10 and includes the following steps: obtaining the dried SLS glass precursor gel (step 12); heating the SLS glass precursor gel to a temperature being below the melting point (step 14); maintaining the temperature for a time sufficient to expand the dried gel (step 16); and expanding the gel to form a glass foam (step 18). The resulting foam may be insoluble in water such that it has good durability during use. The glass foam can be further processed downstream, if desired, to form various insulating materials (steps 16a, b). For example, insulating materials can be thermally and/or acoustically insulating, and be formed in sheets, rolls, spheres, strips, and the like. While the method shown and described with reference to FIG. 2 is focused on the preparation and use of a SLS glass precursor gel, those skilled in the art will know and understand how to adapt the following teachings to other types of glass precursor gels, such as gels composed to produce, for example, borosilicate glass foam or lead sealing glass foam.

The composition of the dried glass precursor gel facilitates rapid heating into the glass foam. After obtaining the gel in step 12, the gel is heated to a temperature below the melting point of the gel in step 14. This temperature could be at or above the softening point of the gel. In some aspects, the softening point of the gel can be 730° C. Heating the dried glass precursor gel to a temperature being between 650° C. to 850° C., including all ranges, subranges, and values therebetween, can start the expanding process. For example, the gel can be heated to 800° C. (or 850° C.) and maintained at 800° C. for a time sufficient to expand the dried glass precursor gel to the desired final volume. This time can be about 30 minutes, for example, between 0.5 and 60 minutes, including all ranges, subranges, and values therebetween. In some aspects, the gel is maintained at 800° C. for 30 minutes, and subsequently, the gel begins to expand to the desired final volume.

In another example, the gel begins to expand into a glass foam simultaneously with maintaining the temperature. In this example, the gel can be heated to 730° C. (or 650° C.). When the temperature reaches 730° C., the dried glass precursor gel can start expanding to form the glass foam. Simultaneously, the temperature of 730° C. is maintained for a time sufficient (e.g., 30 minutes) and the gel continues to expand into the glass foam during the 30 minutes to reach the desired final volume.

In yet another example, the steps of heating the dried glass precursor gel and maintaining the temperature can both be simultaneously performed with expanding the dried glass precursor. For example, the gel can be heated to 800° C. When the temperature reaches the softening point (e.g, 730° C.), expansion begins. During expansion, the gel can continue to be heated until it reaches 800° C. such that both the heating and expanding steps are overlapping and/or occur together. After reaching 800° C., the temperature of 800° C. can be maintained for the time sufficient to expand the gel. During this time (e.g., 30 minutes), the gel continues to expand such that the maintaining and expansion steps are also overlapping and/or occur together. After the time, the formed glass foam reaches its final volume, and the foam can be further used and/or processed.

Alternatively, the steps can occur sequentially such that the dried glass precursor gel is heated to the temperature being in the range of 650° C. to 850° C. (step 14). After reaching the desired temperature, the dried glass precursor gel can be maintained at the temperature for 30 minutes (step 16). After the 30 minutes, the dried glass precursor gel can expand to form the glass foam (step 18). In either a simultaneous or sequential method, the onset of the expansion behavior in an SLS gel is seen at the softening point, 730° C., or just below at 650° C., and was unexpected because many silica gels, such as those precipitated from an alkoxide precursor, will typically begin to densify and sinter at these temperatures.

As the gel is heated to or beyond its softening point, the resulting glassy material within the dried gel beings to flow, closing off some or all of its nanometer-sized pores. Without wishing to be bound by any particular theory, the inventors of the present disclosure believe that water or $NaNO_3$ decomposition products become trapped in these pores. These trapped gases expand with the increasing temperature, eventually leading to a volume expansion with the pores of the dried glass precursor gel. This expansion creates the glass foam, having pores that are larger than the nanometer-sized pores in the gel. Thus, the final volume of the glass foam, including the expanded pores, is larger than the initial volume of the dried glass precursor gel. Further, the final density or density of the resultant foam is less than the density of the gel.

In one example, the SLS glass precursor gel is comprised of a bulk amorphous oxide-based matrix that includes at least silica ($SiO_2$), sodium oxide ($Na_2O$), and calcium oxide (CaO) as the primary constituent oxides, chemically-entrained water, and byproduct $NaNO_3$ as the extending swelling agent. The amorphous oxide-based matrix of the SLS glass precursor gel, for example, preferably comprises 60 mol % to 85 mol % silica, 8 mol % to 18 mol % sodium oxide, and 5 mol % to 15 mol % calcium oxide.

The amorphous oxide-based matrix may also optionally include up to about 10 mol % combined of aluminum oxide ($Al_2O_3$), magnesium oxide (MgO), and/or potassium oxide ($K_2O$) as additional primary constituent oxides, and any of the other secondary materials recited above including other glass-network formers, colorants such as iron oxide ($Fe_2O_3$), other agents (e.g., oxidizers, reducers, fining agents, etc.), and impurities common in the glass industry. Moreover, as described above, water is chemically-entrained within the amorphous oxide-based matrix such that, when the gel is heated at a rate of 5° C. per minute starting from STP (1 atm pressure and 20° C.), water vapor continues to evolve above 125° C. and up to 400° C., and may even retain as much as 0.5 wt. % water at 400° C. The SLS glass precursor gel is porous and friable, having a density of less than about 2.0 g/cm$^3$ and a surface area greater than about 20 m$^2$/g, as described above, and the components that make up the amorphous oxide-based matrix are already homogenously chemically mixed prior to being heated in step 14.

Certain components impart greater chemical durability to the gel and the resulting glass foam. For example, aluminum oxide, in particular, enhances the chemical durability of glass and reduces the tendency of devitrification in the molten glass. This component may be introduced by adding an alumina-bearing mineral to the caustic aqueous sodium-based solvent along with quartz sand under hydrothermal conditions. Adding the alumina-bearing material at this time results in aluminum oxide being chemically integrated into the dissolved sodium silicate during hydrothermal dissolution of the quartz sand. Some examples of alumina-bearing minerals that may be used here are nepheline syenite, aplite, and calumite slag. The aluminum oxide may also be introduced into the silicate solution in the form of dissolved sodium aluminate. It may be desirable to have a final foam with 1 mol % to 2 mol % $Al_2O_3$. However, in some aspects, it may be desirable to limit the total aluminum oxide content to not more than 4 mol % of the dried glass precursor gel by weight. Additionally, primary oxides such as CaO and/or greater than 70 mol % $SiO_2$ impart chemical durability to the resulting glass foam, forming a foam that is insoluble in water. Such an insoluble foam may have greater applicability as or in an insulating material.

While one method of producing the dried glass precursor gel is described in FIG. 1, it is also possible to produce the dried glass precursor gel in other ways. In another aspect, as depicted here in FIG. 2, the SLS glass precursor gel is obtained by (1) providing a silicate solution that includes a dissolved soluble alkali silicate (e.g., sodium silicate) (step 12a); (2) combining the silicate solution with a soluble calcium salt to form a wet precipitate (step 12b); and (3) deriving a dried SLS gel from the wet precipitate (step 12c). A specific implementation of steps 12a-12c will be described below in more detail. It should be understood, however, that the SLS glass precursor gel can also be obtained through other mechanisms not expressly described, but nonetheless known to skilled artisans, including alternative ways to provide the silicate solution in step 12a such as by purchasing and/or obtaining the silicate solution or chemically preparing the solution by melting a mixture of quartz sand and soda ash and then dissolving the resultant product in water.

The silicate solution can be provided in step 12a by hydrothermally dissolving quartz sand in a caustic aqueous sodium-based solvent. The caustic aqueous sodium-based solvent may be a strong sodium base, such as sodium hydroxide (NaOH), which is preferably concentrated to greater than 10 wt. % (of the sodium base) so as to make dissolution of the quartz sand easier. One example of a suitable strong sodium base is 18 wt. % NaOH. The hydrothermal dissolution of quartz sand may be accomplished in a pressure vessel at a pressure above atmospheric pressure. There, the quartz sand may be dissolved in the caustic aqueous sodium-based solvent at a temperature between about 25° C. and about 300° C., including all ranges, subranges, and values therebetween, preferably between about 200° C. and about 300° C., and a pressure of about 10 atmospheres to about 100 atmospheres, including all ranges, subranges, and values therebetween, preferably about 30 atmospheres to about 50 atmospheres, over the course of about 3 hours to less than 24 hours, including all ranges, subranges, and values therebetween. The silicate solution formed under these hydrothermal conditions contains a dissolved solids phase of sodium silicate. The dissolved sodium silicate produced has the general chemical formula $Na_2O.xSiO_2$ with x ranging from 1.5 to 3.75, including all ranges, subranges, and values therebetween.

While the dissolved sodium silicate can be produced under various pressures, this dissolution process may occur without utilizing a gas stream (e.g., helium and/or hydrogen gas) in the place of air. The dissolved sodium silicate and the resulting glass precursor gel can be formed without using a helium and/or hydrogen gas stream.

The ratio of $Na_2O$ to $SiO_2$ in the dissolved sodium silicate may have to be adjusted to ensure the amorphous oxide-based matrix of the SLS glass precursor gel has the proper mole percentages of silica, sodium oxide, and calcium oxide. In particular, the mole percent proportions of the primary constituent oxides listed above can be met when the amorphous oxide-based matrix has a molar ratio of $Na_2O$:$CaO$:$SiO_2$ of approximately 1:1:6 with variances between 0.8:0.8:6 and 1.4:1.3:6 being acceptable for typical container glass. The dissolved sodium silicate in the silicate solution, however, typically includes 2-3 moles of $Na_2O$ for every 6 moles of $SiO_2$. To adjust the molar ratio of $Na_2O$ to $SiO_2$, if necessary, a multiple-step technique may be employed. First, the molar ratio of $Na_2O$ to $SiO_2$ in the dissolved sodium silicate may be reduced with an acid. Nitric acid ($HNO_3$), for example, can be added to the silicate solution in a quantity that neutralizes some of the $Na_2O$ to bring the molar ratio of $Na_2O$ to $SiO_2$ in the dissolved sodium silicate down to approximately 2:6. Nitric acid neutralizes sodium silicate into silicic acid ($SiH_4O_4$) and forming sodium nitrate ($NaNO_3$). A further reduction of the molar ratio of $Na_2O$ to $SiO_2$—down to approximately 1:6—is achieved in step 12(b) when, as will be explained in more detail below, sodium is displaced by calcium.

Other primary constituent oxides and secondary materials that may be desired in the amorphous oxide-based matrix of the SLS glass precursor gel may be added into the silicate solution during step 12a as a solid or they may be dissolved in water prior to their addition to the solution. Some other materials that may be added into the silicate solution include aluminum oxide, magnesium oxide, potassium oxide, iron oxide, titanium oxide, zirconium oxide, barium oxide, strontium oxide (SrO), sulfur trioxide ($SO_3$), and oxides of selenium, cobalt, chromium, manganese, and lead.

The list of secondary materials that may be introduced into the silicate solution during step 12a is more extensive than those just mentioned. Colorants and decolorants may be added such as one or more of iron oxides (e.g., FeO and/or $Fe_2O_3$), chromium oxides (e.g., CrO or $Cr_2O_3$), cobalt oxides (e.g., CoO or $Co_2O_3$), nickel, copper, selenium, manganese dioxide, cerium oxide, titanium, and a combination of sulfur, iron, and carbon. Another class of secondary materials that can be added to the silicate solution is fining agents such as, for example, the combination of sodium sulfate ($Na_2SO_4$), carbon, arsenic oxide, and antimony oxide. Still further, oxidizers or reducers can be added to the silicate solution to modify, if desired, the redox number of the molten glass derived from the SLS glass precursor gel. Examples of common oxidizers and reducers include calcium sulfate ($CaSO_4$), sodium nitrate ($NaNO_3$), potassium nitrate ($KNO_3$), iron pyrite ($FeS_2$), and graphite.

In step 12c, the soluble alkaline earth metal (e.g., calcium salt) may be added to the silicate solution to derive a wet precipitate that has same proportions of the primary constituent oxides (e.g., silica, sodium, and calcium) desired in the amorphous oxide-based matrix of the SLS glass precursor gel. This step involves adding the soluble calcium salt to the silicate solution in an amount that brings the molar ratio of $Na_2O$:$CaO$:$SiO_2$ in the wet precipitate to approximately 1:1:6, which is the desired molar ratio of the amorphous oxide-based matrix and, in turn, the soda-lime-silica glass produced from the SLS glass precursor gel. The soluble calcium salt may include, for example, calcium nitrate ($Ca(NO_3)_2$), calcium chloride ($CaCl_2$)), calcium hydroxide ($Ca(OH)_2$) or any other soluble calcium salt or combination of soluble salts that provides a source of calcium ions. When added to the silicate solution, the calcium ions provided by the soluble calcium salt displace sodium in the dissolved sodium silicate, thus introducing calcium oxide into the silicate, which causes the newly-modified sodium silicate to precipitate out of solution as the wet precipitate. And since every 1 mole of calcium ions (which results in a corresponding mol of CaO) displaces 1 mole of $Na_2O$ in the dissolved sodium silicate, the amount of the soluble calcium salt that needs to be added to the silicate solution to provide the wet precipitate with the 1:1:6 molar ratio of $Na_2O$:$CaO$:$SiO_2$ can be easily calculated based on the molar ratio of $Na_2O$:$SiO_2$ in the silicate solution from step 12a.

The displacement of $Na_2O$ with CaO, and the precipitation of the wet precipitate, is preferably carried out with the silicate solution being as concentrated as possible. It has been found, in fact, that as the dissolved sodium silicate becomes more dilute in the silicate solution, the amount of $Na_2O$ in the wet precipitate decreases while the amounts of $SiO_2$ and CaO are not similarly affected. This, in turn, can increase the respective mole percentages of $SiO_2$ and CaO in the wet precipitate, potentially beyond what is acceptable, due to the isolated loss of $Na_2O$. The potential for the unintended loss of $Na_2O$ during step 12c can thus be countered by performing step 12 with a concentrated silicate solution. A suitably concentrated silicate solution may comprise at least 5 wt. % sodium silicate at the end of step 12a and, more preferably, between 25 wt. % and 40 wt. % sodium silicate at the end of step 12a.

The phenomenon of isolated $Na_2O$ loss from the wet precipitate based on the concentration of the silicate solution has been demonstrated in a simple experiment. Specifically, four separate samples of 281 grams of STAR-grade sodium silicate were diluted with 0 L, 1 L, 2 L, and 3 L of water. Each solution of the sodium silicate was then precipitated with 34.5 grams of calcium nitrate dissolved in 500 mL of water. An SLS glass precursor gel was obtained from each sample, melted and formed into glass, polished, and then analyzed with x-ray fluorescence to determine its glass chemistry composition. Assuming 100% ion exchange efficiency between Na and Ca, the nominal composition of the four samples of glass reported as mol % fractions of the total primary constituent oxides should be about 72.2 mol % $SiO_2$, 15.8 mol % $Na_2O$, and 12.0 mol % CaO. But, as shown below in table 2, the $Na_2O$ mole percentage of the glass (and thus the amorphous oxide-based matrix of the SLS glass precursor gel that formed the glass) began to decrease as the dissolved sodium silicate became more dilute prior to precipitation with calcium nitrate, while the undiluted sample retained nearly all of the $Na_2O$.

TABLE 2

Effects of Dilution on Sodium Oxide Content

| | | Composition (mol %) as a fraction of the total primary glass-forming oxides | | |
| --- | --- | --- | --- | --- |
| | | $SiO_2$ | $Na_2O$ | CaO |
| | Nominal | 72.1 | 15.9 | 12.0 |
| Sodium | 0 | 70.4 | 15.7 | 12.5 |
| Silicate | 1 | 72,0 | 14.1 | 12.3 |
| Dilution (L) | 2 | 72.3 | 10.3 | 15.6 |
| | 3 | 72.8 | 8.9 | 16.5 |

The dried SLS glass precursor gel can be derived from the wet precipitate in step 12c by removing the liquid solvent. Removal of the liquid solvent can be achieved by any number of separation techniques. Centrifugation, membrane osmosis, filter press, screw press, chemical separation, and/or mechanical compounding (i.e., squeezing) are notable examples of ways to separate the liquid solvent from the wet precipitate. The remaining solids—which have been chemically prepared in steps 12a to 12c to have the desired glass chemistry formulation of soda-lime-silica glass—may then be dried. Drying can be performed in a convection oven at moderate temperatures of about 100° C. to about 500° C., for example, or it can be performed in any other suitable manner at conditions sufficient to extract residual solvent from the recovered solids. In one example, the drying temperature is 120° C. Rinsing of the recovered solids between solvent removal and drying may optionally be performed to wash away any reactants and/or reaction byproducts. When the liquid solvent has been satisfactorily removed, the SLS glass precursor gel remains, and at this point the gel is ready to be used as a feedstock for making glass products according to steps 14 through 18.

Figure 3:
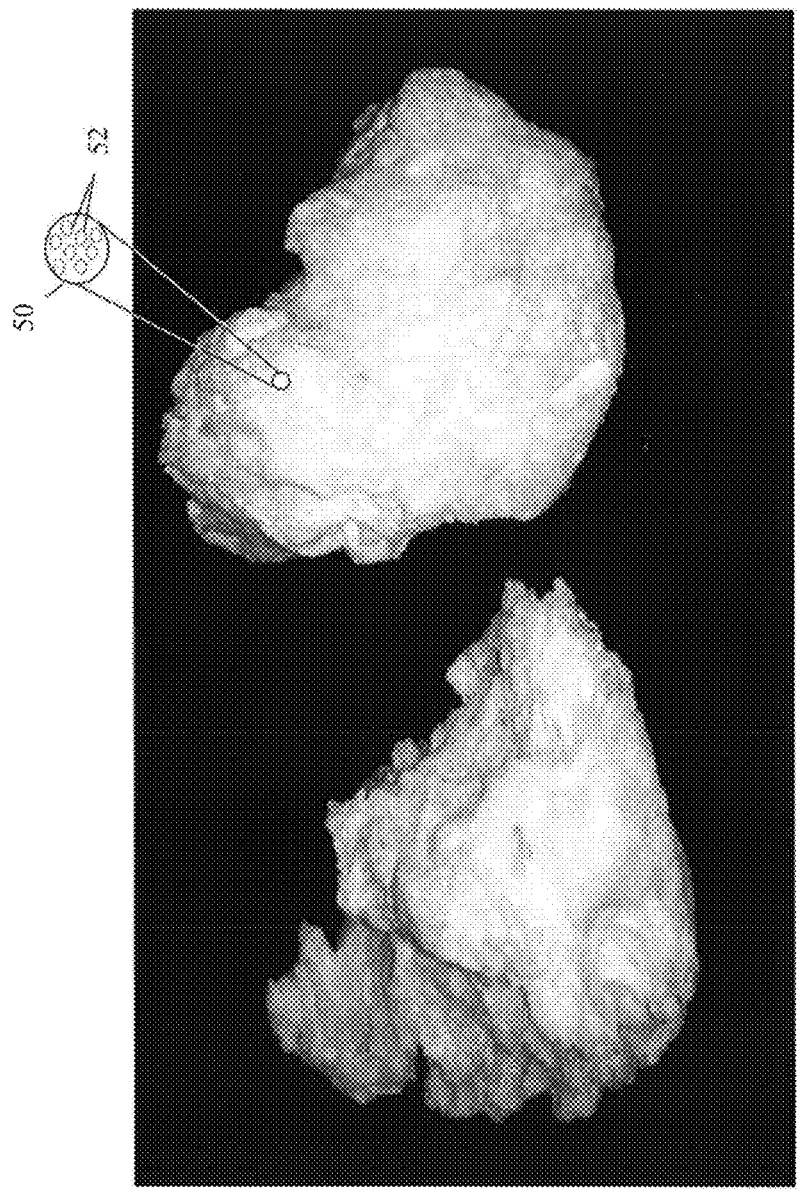
FIG. 3 is a photograph of two glass foam samples after undergoing expansion in accordance with an illustrative embodiment of the present disclosure.

FIG. 3 illustrates examples of the glass foam formed by the method described herein. Both Samples A and B are foams from the dried glass precursor gel prepared according to the above-described method. The volume expansion was several times the initial volume. These samples were heated to 800° C., and maintained at 800° C. for 30 minutes. During heating, at approximately 650° C., the dried gels began to expand, ultimately resulting in the foam depicted in Samples A-B once a temperature of 800° C. was reached. While not wishing to be bound by any particular theory, the inventors believe that resulting foams contain closed pores 52, as depicted in the blown-up area 50, which were closed off during heating. Trapped gases within the closed pores 52 expanded to form the foam structure.

In some aspects, a separate, or externally added, blowing agent is not required to form a glass foam. A blowing agent is a substance that can cause or enhance the foaming behavior of the precursor material. Blowing agents are capable of producing a cellular structure and increasing the relative stiffness of the material during the foaming process. Chemically bound $H_2O$ and/or $NaNO_3$, which are part of the glass precursor gel's matrix, well-dispersed, and homogenously entrained therein (e.g., in the gel's pores), assist in foam expansion when rapidly heated. While not wishing to be bound by any particular theory, the inventors believe that the decomposition of the $NaNO_3$ byproduct(s) when present in the glass precursor gel in small amounts (e.g., <1% of $NaNO_3$ byproduct) causes and/or facilitates foam expansion. Such byproducts include $N_2$, $O_2$, $NO_x$, and the like. Sufficient heating temperatures for decomposition include those between 400° C. and 800° C., including all ranges, subranges, and values therebetween. Therefore, there may not be a need to add a separate blowing agent (e.gs., sodium carbonate, calcium carbonate, calcium sulfate, carbon, sugar, and the like), which may be added to materials such as cullet particles.

In conjunction with the above description, the formed foam may be utilized as is or further processed by incorporating it with other components to form an insulating material. The insulating material can be formed into various shapes and sizes to provide suitable thermal insulation and/or noise prevention/reduction products for use in various industries.

There thus has been disclosed a glass foam and methods of its formation. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of producing a glass foam, the method comprising:
    obtaining a dried glass precursor gel comprising nanometer-sized pores and a bulk amorphous oxide-based matrix having an inorganic network of primary constituent oxides, the primary constituent oxides comprising 30 mol % to 90 mol % silica ($SiO_2$) and one or more of the following: (A) 0.1 mol % to 25 mol % of one or more alkali oxides in sum total, (B) 0.1 mol % to 30 mol % of one or more alkaline earth oxides in sum total, (C) 1 mol % to 25 mol % boric oxide, (D) 5 mol % to 80 mol % lead oxide, or (E) 0.1 mol % to 15 mol % aluminum oxide;
    heating the dried glass precursor gel to a temperature below the melting point of the gel; and
    maintaining the temperature for a time sufficient to expand the dried glass precursor gel; and
    expanding the dried glass precursor gel to form a glass foam.

2. The method of claim 1 wherein the step of obtaining a dried glass precursor gel comprises the primary constituent oxides including 60 mol % to 85 mol % $SiO_2$, 8 mol % to 18 mol % $Na_2O$, and 5 mol % to 15 mol % CaO and the bulk amorphous oxide-based matrix being homogeneously chemically mixed.

3. The method of claim 1 wherein the step of obtaining a dried glass precursor gel comprises the dried glass precursor gel compositionally comprising 1 mol % to 2 mol % $Al_2O_3$.

4. The method of claim 3 wherein the step of obtaining a dried glass precursor gel comprises the glass precursor gel compositionally comprising not more than 4 mol % $Al_2O_3$.

5. The method of claim 1 wherein the step of obtaining a dried glass precursor gel comprises the dried glass precursor gel having a molar ratio of alkali oxide to the alkaline earth oxide to silica of 0.8:0.8:6 to 1.4:1.3:6.

6. The method of claim 1 wherein the step of obtaining the dried glass precursor gel comprises the dried glass precursor gel being free of pre-melted glass, recycled glass, rock, clay, ore, or ash.

7. The method of claim 1 further comprising:
    obtaining a wet glass precursor gel comprising the bulk amorphous oxide-based matrix being homogeneously chemically mixed and having a gel density of less than 2.0 $g/cm^3$; and
    drying the wet glass precursor gel to form the dried glass precursor gel before the step of obtaining a dried glass precursor gel.

8. The method of claim 7 wherein the step of expanding the dried glass precursor gel comprises the glass foam having a foam density being less than the gel density.

9. The method of claim 1 wherein the step of heating the dried glass precursor gel comprises the temperature being between 650° C. and 850° C.

10. The method of claim 1 wherein the step of heating the dried glass precursor gel produces substantially no carbon dioxide.

11. The method of claim 1 wherein the step of maintaining the temperature comprises the time sufficient to expand the dried glass precursor gel being between 0.5 and 60 minutes.

12. The method of claim 1 wherein the step of heating the dried glass precursor gel comprises the temperature being at or above a softening point of the gel.

13. The method of claim 1 wherein the step of expanding the dried glass precursor gel comprises the glass foam having a plurality of closed pores.

14. The method of claim 1 wherein the step of expanding the dried glass precursor gel comprises expanding the dried glass precursor gel to a final volume being greater than an initial volume of the dried glass precursor gel.

15. The method of claim 1 further comprising incorporating the glass foam into an insulating material after the step of expanding the dried glass precursor gel.

16. The method of claim 1 wherein the method does not include using a separate blowing agent.

17. The method of claim 1 wherein the steps of maintaining the temperature and expanding the dried glass precursor gel are performed simultaneously.

18. A method of producing an insulating material, the method comprising:
obtaining a dried glass precursor gel comprising nanometer-sized pores and a bulk amorphous oxide-based matrix having an inorganic network of primary constituent oxides, the primary constituent oxides comprising 30 mol % to 90 mol % silica ($SiO_2$) and one or more of the following: (A) 0.1 mol % to 25 mol % of one or more alkali oxides in sum total, (B) 0.1 mol % to 30 mol % of one or more alkaline earth oxides in sum total, (C) 1 mol % to 25 mol % boric oxide, (D) 5 mol % to 80 mol % lead oxide, or (E) 0.1 mol % to 15 mol % aluminum oxide;
heating the dried glass precursor gel to a temperature below the melting point of the gel; and
maintaining the temperature for a time sufficient to expand the dried glass precursor gel;
expanding the dried glass precursor gel to form a glass foam; and
incorporating the glass foam into the insulating material.

19. The method of claim 18 wherein the step of obtaining a dried glass precursor gel comprises the primary constituent oxides including 60 mol % to 85 mol % $SiO_2$, 8 mol % to 18 mol % $Na_2O$, 5 mol % to 15 mol % CaO, and 1% to 2% $Al_2O_3$.

20. The method of claim 18 further comprising:
obtaining a wet glass precursor gel comprising the bulk amorphous oxide-based matrix being homogeneously chemically mixed and having a gel density of less than 2.0 g/cm$^3$; and
drying the wet glass precursor gel to form the dried glass precursor gel before the step of obtaining a dried glass precursor gel.

21. The method of claim 18 wherein the method does not include melting raw materials to form the dried glass precursor gel prior to the step of obtaining a dried glass precursor gel.

22. The method of claim 18 wherein step of obtaining a dried glass precursor gel comprises the bulk amorphous oxide-based matrix being free of a polymer.

23. The method of claim 18 wherein step of expanding the dried glass precursor gel comprises not using a mold to form the glass foam.

* * * * *